United States Patent [19]
Gill

[11] Patent Number: 5,794,988
[45] Date of Patent: Aug. 18, 1998

[54] GRIP COUPLING

[76] Inventor: Ajit Singh Gill, 4169 Bennion Rd., Salt Lake City, Utah 84119

[21] Appl. No.: 829,209

[22] Filed: Mar. 31, 1997

Related U.S. Application Data

[63] Continuation-in-part of Ser. No. 784,572, Jan. 21, 1997, abandoned, which is a continuation-in-part of Ser. No. 766,347, Dec. 16, 1996, abandoned.

[51] Int. Cl.⁶ ................................................. F16L 55/00
[52] U.S. Cl. ........................... 285/305; 285/308; 285/321
[58] Field of Search ................................. 285/305, 308, 285/321, 309, 310, 39

[56] References Cited

U.S. PATENT DOCUMENTS

| | | |
|---|---|---|
| 2,877,732 | 3/1959 | Eaton ........................... 285/321 |
| 2,901,269 | 8/1959 | Rickard ......................... 285/308 |
| 3,345,087 | 10/1967 | Hanes et al. ................... 285/321 |
| 3,902,743 | 9/1975 | Martin .......................... 285/308 |
| 4,856,823 | 8/1989 | Heren ........................... 285/308 |
| 5,004,274 | 4/1991 | Baas ............................ 285/321 |
| 5,374,088 | 12/1994 | Moretti et al. ................. 285/308 |
| 5,536,047 | 7/1996 | Detable et al. ................. 285/308 |
| 5,653,475 | 8/1997 | Scheyhing et al. .............. 285/308 |

Primary Examiner—Eric K. Nicholson
Attorney, Agent, or Firm—Mallinckrodt & Mallinckrodt

[57] ABSTRACT

A coupling for attachment to the end portion of a pipe having a circumferential groove includes a coupling body which receives the end portion of the pipe therein and a circumferential open ended resilient ring held by the coupling body. The ring is expanded by the larger outer diameter of the pipe as the end portion of the pipe is pushed into the coupling body but contracts back to its original diameter into the groove. With the ring in the groove, the coupling is locked to the end of the pipe and the pipe cannot be pulled from the coupling. The coupling is also provided with means to expand the ring mechanically so that the pipe can be released from the coupling or so that, while the pipe is being received by the coupling, the pipe does not encounter the ring until the ring is mounted into the groove of the pipe. The coupling can be provided with rings at each end to couple together two pipes end-to-end that may or may not have end portion grooves, or it can have a ring at one end and threads, flanges, a set of partially rotatable cammed jaw members, or other connector at the other end. The coupling can be used for pipe fittings, hoses, valves, pressure vessels, structural pipe, and electrical conduits.

15 Claims, 11 Drawing Sheets

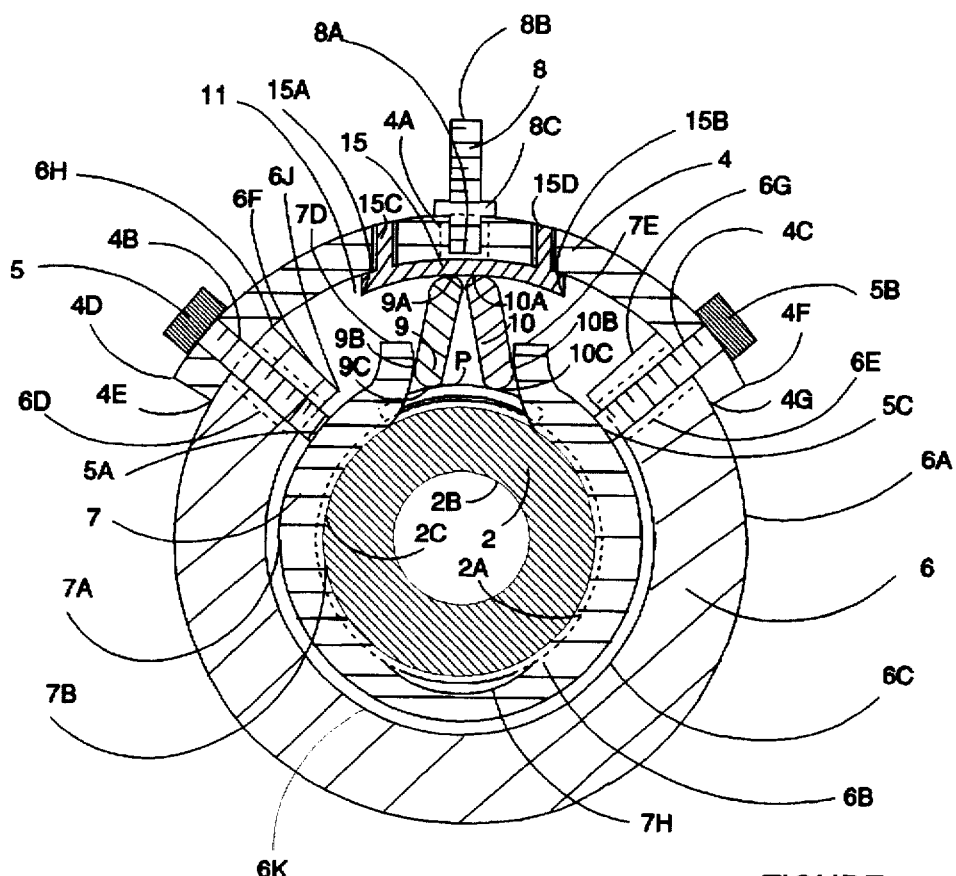
FIGURE 1, SECTION 1-1.

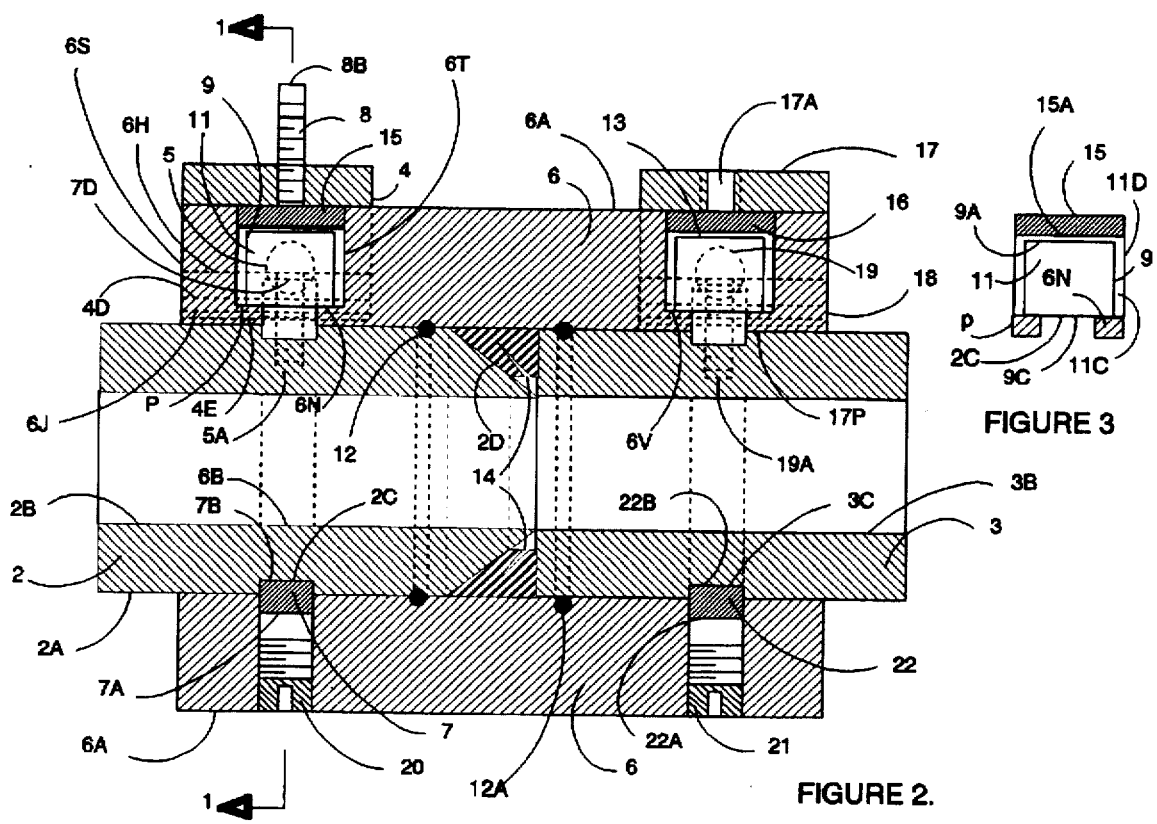

FIGURE 14, SEC. 2-2.

GRIP COUPLING

RELATED APPLICATION

This is a continuation-in-part of my application Ser. No. 08/784,572 filed Jan. 21, 1997, which was continuation-in-part of of my application Ser. No. 08/766347, filed Dec. 16, 1996, which now are abandoned.

BACKGROUND OF THE INVENTION

1. Field

The invention is in the field of full grip couplings for the attachment of end portions of pipes to carry fluid, and for pipe fittings, pipe dead ends, valves and valve covers, pressure vessels, structural pipe, electrical conduits, wherein the end portion to be coupled to or attached to has a circumferential groove from the end of the element, which mates with the coupling to secure it to the element and prevent axial movement of the element with respect to coupling. The invention also includes the couplings to attach smooth ended pipes.

2. State of the Art

There are couplings currently in use to connect grooved ended pipe and valves which are shown under U.S. Pat. Nos. 3,695,638; 3,761,114; 4,471,979; 4,561,678; 4,522,434; and 4,611,839. These couplings are formed of two arcuate pieces, each being extended circumferentially around the ends of two pipes and their ends are clamped around the pipes with bolts, and a gasket is held by the coupling around the abutting ends of the pipe. Pipes must be aligned in exact position and grooves must be spaced exactly to receive the keys or flanges of the coupling pieces as the coupling pieces are mounted around the pipes and tightened around. Then, there is my coupling under U.S. Pat. No. 5,387,017 which has jaw members to engage the shoulders of the pipes. Like my previous invented coupling, the new invented coupling requires only one man to attach the coupling to the ends of the pipes.

If the coupling connecting the two pipes is made of different metal from the pipes, then, to prevent electrolysis, it is desired that the same fluid does not come in contact with the coupling and the pipes. To achieve this, the couplings currently in use employ a seal which is mounted around the end portions of pipes to break the fluid contact with the coupling which requires considerable amount of work before the coupling can be mounted around the pipes to enclose the seal. The seal invented for the couplings in this invention are mounted in an enclosure created between the ends of the pipes and the inner surface of the coupling body. Thus, pipes are merely pushed into the coupling to enclose the seal.

The new coupling is lighter in weight than my previous invented coupling, and also more economical to construct.

SUMMARY OF THE INVENTION

From here on the word groove will also be understood to include plane end pipe having no groove, and will pertain to grooves or shoulders on the end portion of pipes, grooves in the inner end portions of the coupling body. Also it is understood that the word Pipe includes all other circumferential elements with or without a circumferential groove which might be coupled by the coupling. This invention works on the mathematical principle that the difference in the circumferential length of any two circles equals 3.1416 (D1–D2), where D1 and D2 are the diameters of the circles. In the design of this invented coupling the required depth of the grooves which are locked by an open-ended ring is very small. To force said ring to open to a minutely larger increment in its original diameter does not require much force. By minutely enlarging the diameter of the ring, the ring is freed from the groove on the end portion of the pipe. The preferable means to accomplish the task of flexing the ring to a larger diameter in this invention are a bolt and an arcuate piece or a bolt, an arcuate piece and two mini arcuate levers or a bolt and two mini arcuate levers. The combination which is chosen depends on the size and design requirement of the coupling. With aid of a bolt passing through a cover covering a cavity, the arcuate piece and two mini arcuate levers are used to pry open the open ended ring to a larger diameter than its original diameter. During the opening operation to open the open-ended ring to a larger diameter than its original diameter, the action of the bolt on the arcuate piece and the mini levers create two opposite moments in the opposite end of the resilient ring, which resist the opening of the ring and make the ring to swing back to its original position once the levers are uncommissioned. The two mini levers in a vertical radial section of the coupling appear as an inverted "V" with its spread oriented toward the axis of the coupling and footed on two arcuate ridges with their radius center toward or on the axis of the coupling. The mini levers are put in a movable locked position hemmed between and among elements; including two walls of a cavity created in the end of the coupling, an arcuate piece, two open end portions of a resilient ring emerging from the groove in the end portion of the coupling, and two oppositely situated arcuate ridges with their center toward or at the axis of the coupling.

According to this invention, a coupling for attachment to the end of a pipe having a circumferential groove includes a coupling body with a receiving opening therein so that the coupling body closely receives and surrounds the end portion of a pipe to be coupled. The groove in the end portion of the pipe is brought to a position to coincide with the corresponding opposite inner groove in the end portion of the coupling, partially housing an open-ended resilient ring in the groove in the inner body of the coupling. The outer edge away from the center of the coupling defining the inner diameter of the ring is rounded to a degree to facilitate the receiving of the pipe into the coupling. The inner diameter of the ring is less than the inner diameter of the coupling. The outer diameter of the inner groove (i.e., the diameter nearest the axis of coupling) in the end portion of the coupling is also the inner diameter of the coupling. There are two modes to lock the resilient ring ( which is housed in the groove in the end portion of the coupling) into the groove on the end portion of the pipe. One is, simply to push the pipe into the receiving end opening of the coupling until it coincides with the corresponding opposite groove in the end portion of the coupling. In doing so, the resilient open ended ring flexes to a larger diameter inside the inner groove of the coupling body, then swings back to its original diameter as soon as the groove inside the coupling body coincides with the groove on the end portion of the pipe. The second mode is by means located inside of a cavity situated in the end of the coupling. The means is an assembly of components installed in a cavity created in the end of the coupling body covered by an arcuate cover fastened to the coupling body by means of bolts. The assembly consists of a bolt, an arcuate piece and two mini levers positioned in a form of inverted "V" shaped either from a single piece of material or from two distinct pieces. The mini levers are located in a movable locked position hemmed between and among elements; including two walls of a cavity created in the end of the coupling; an arcuate piece; two open end portions of a resilient ring, and two parallel oppositely situated arcuate ridges. The action of the bolt on the movable arcuate piece transmits force to push apart the two end portions of the resilient ring and also forces the mini levers to slide and spread their feet which are footed to slide on the two said arcuate ridges inside the cavity. During the action of the bolt while the ring is being open apart, the ring is pushed along the direction of the bolt and against the coupling body inside of the groove on the other side of the coupling, directly opposite to the two open ends of the ring. The bolt can keep the open-ended resilient ring in an expanded position to a desired diameter till the ring is brought back to its original diameter by mounting it into the opposite groove on the end portion of the pipe. Depending on the need and the required design of the ring, in some applications driving means to flex the ring to a larger diameter than its original diameter need to be only a driving bolt passing through a cover and movable an arcuate piece, but in other applications said bolt, and an arcuate piece and the two mini levers will be needed, yet in other applications two mini levers and said bolt are sufficient.

The two bolts provided to secure the cover to cover the cavity also assist in securing the resilient ring to the pipe, with a tight grip, or in securing the ring with a tight grip to the pipe having a plane surface in the end portion of the pipe. In some applications, more than two of the above mentioned bolts may be included to provide a still tighter grip than that is possible with only two said bolts.

It is also possible that a single arcuate cover can be provided to cover the two cavities situated oppositely in the end of the coupling body, or it can be made to provide not only the covers for two said cavities but also can provide the two outer walls each wall bearing a arcuate ridge as well. Such a cover needs only a single bolt to fasten it to the outer body of the coupling. It is equally possible that individual cover for each cavity can be made to provide not only a cover for the cavity but also provide an outer wall bearing a arcuate ridge. Further, it is possible to create an integral cover entirely from the end portion of the coupling body itself, then cavity will need only to be supplied the outer cover to provide a wall which bears a arcuate ridge, and that cover can be fasten to the end face of the coupling body by mean of two bolts. The design of the open-ended resilient ring can vary from one application to an other application, and also thickness of the ring can vary from section to section. In extreme variation in thickness of the resilient ring may look like a gear. It is also understood that by widening the width of the resilient ring, arcuate rows of gripping teeth in the inner surface of the ring can be provided which can bite into plastic or rubber pipe. The body of the coupling can be made either from a arcuate tube or from two arcuate pieces of high strength material, held in place to make the coupling body by means of bolts or by dovetail joints or by welding together the two pieces.

In the design of some valves, the coupling of this invention can be incorporated within the inlet and outlet of a valve as one of the components of the valve, or the valve can be incorporated in the coupling of this invention.

Various type of seals to seal the leakage from the coupling can be provided, depending on the requirement of the piping system. To make it easier to connect and disconnect the pipes and to break contact of fluid with the coupling body, a lopsided trapezoidal seal bearing a slanting arcuate slit in its inner surface is enclosed in an enclosure provided by the ends of the pipes and the inner surface of the coupling body.

THE DRAWINGS

The best mode presently contemplated for carrying out the invention is illustrated in the accompanying drawings not drawn to any scale, in which:

FIG. 1 is a transverse vertical section of the coupling of FIG. 2 taken on line 1—1 of FIG. 2;

FIG. 2, the longitudinal vertical section taken through a coupling of the invention used for joining two pipes or any two elements having an end-to-end relationship, and showing the two joined pipes;

FIG. 3, the view of the lever in FIG. 2 is duplicated for clarity.

FIG. 4, the longitudinal vertical section of a valve, where the coupling incorporates the valve, and also where the coupling makes the cover for the valve;

FIG. 5, a longitudinal section of a coupling which has on its one end a connector made of a movable set of cammed jaw members, which I have patent under U.S. Pat. No. 5,387,017;

FIG. 6, a longitudinal section of the coupling used in the structural pipe system where the coupling joins two pipe.

FIG. 7, a longitudinal section of a valve where the coupling joins two parts of the valve by becoming a component in the structure of the valve, and where the coupling also incorporates the valve (body) while joining two pipes;

FIG. 8, the vertical section of two arcuates used in the construction of the body of the coupling;

FIG. 9, a longitudinal vertical section of the coupling used to join two hoses;

FIG. 10, an enlarged transverse vertical partial section to further clarify FIG. 1 and FIG. 2, and the alternative design of the cavity to accommodate the assembly used to open-the-open ended resilient ring to a larger diameter than its natural diameter.

FIG. 11, is the same as FIG. 1, but only arcuate piece driven by a bolt is employed to act on the open end portions of the resilient ring to make the coupling operative.

FIG. 12, the same FIG. 10, except that instead of an arcuate piece on one end they are movably hemmed in by a bolt.

FIG. 14 is the view of the mini lever 9 looking at it by taking a longitudinal vertical section 2—2 through the bolt and the coupling body of FIG. 10.

FIG. 16 is a longitudinal vertical section of a coupling similar to the coupling shown in FIG. 5, which connects pipe and a reducer.

DETAILED DESCRIPTION OF THE ILLUSTRATED EMBODIMENT

Figure 4:
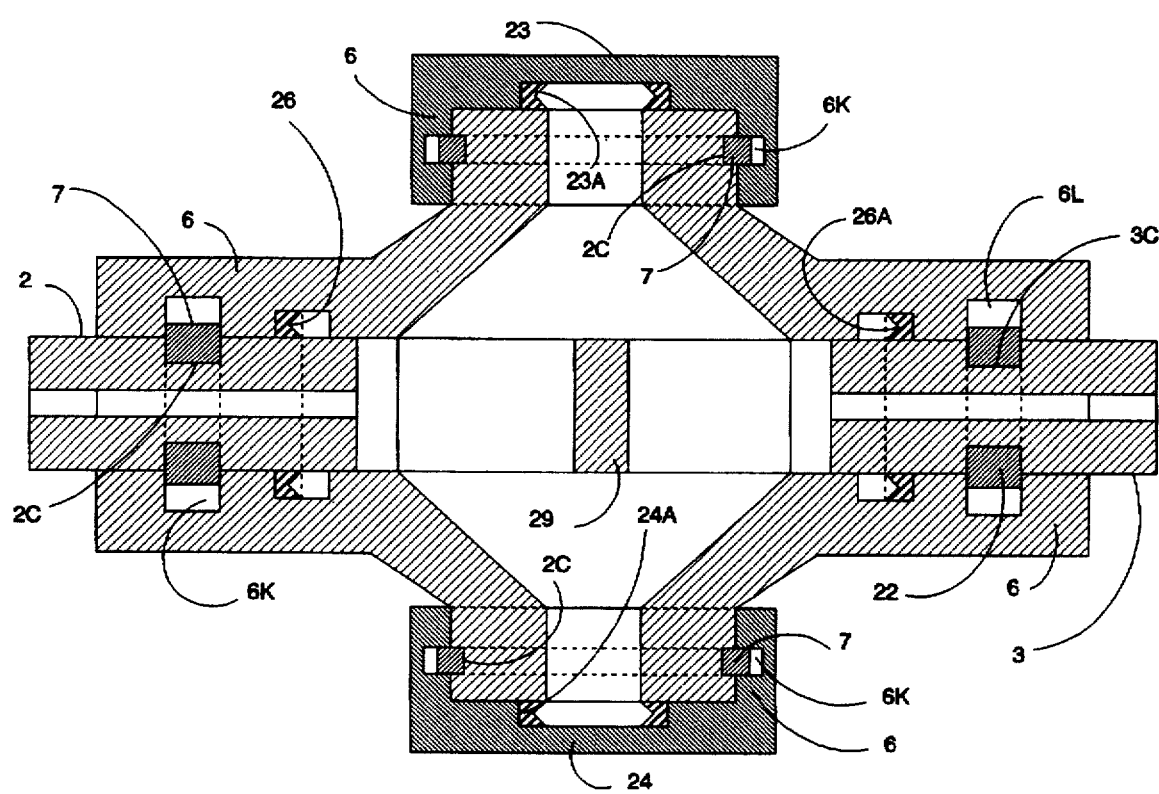

To understand this invention, all figures in the drawings may be studied together. Except FIG. 5, and FIG. 16, but as shown in FIG. 1 and FIG. 2, the invention may take the form of the coupling having two inner grooves 6K and 6L in the end portions of the coupling, housing two respective open-ended rings 7 and 22 with their inner diameters less than the inner diameter of the cylindrical coupling body 6 for joining the ends of two pipes together in an end-to-end relationship. Pipes 2 and 3, in FIG. 2, are provided with circumferential grooves 2C and 3C, respectively, in respective end portions of the pipes. The coupling 6 is made of a length to extend over groove 2c in the end portion of pipe 2, and groove 3c in the end portion of pipe 3 when the ends 2D and 3D of pipe 2 and 3 are received in the cylindrical receiving opening 6B within the body 6. The Coupling body 6 bridges the ends of the pipes 2 and 3 to be joined and is made of a material to withstand the maximum pressure to which the pipe will be subjected. Two arcuate inner grooves 6k and 6L, formed in the end portions of the coupling body, open toward the axis of the coupling, and each groove is fitted with an open-ended resilient ring 7 and 22. The cylindrical body of the coupling may be formed from a tube or from two arcuate pieces 39 and 40 shown in FIG. 8, which are held together by bolts or by two dovetail joints of types 41 or 43.

From here on, words inner and outer pertaining to the diameters of the grooves in the inner body of the coupling and the grooves on the end portions of the pipe, and pertaining also to the resilient ring will be understood with meanings as follows: Inner diameter means the diameter nearest to the axis of the coupling and outer diameter means the diameter farthest from the axis of the coupling.

Figure 11:
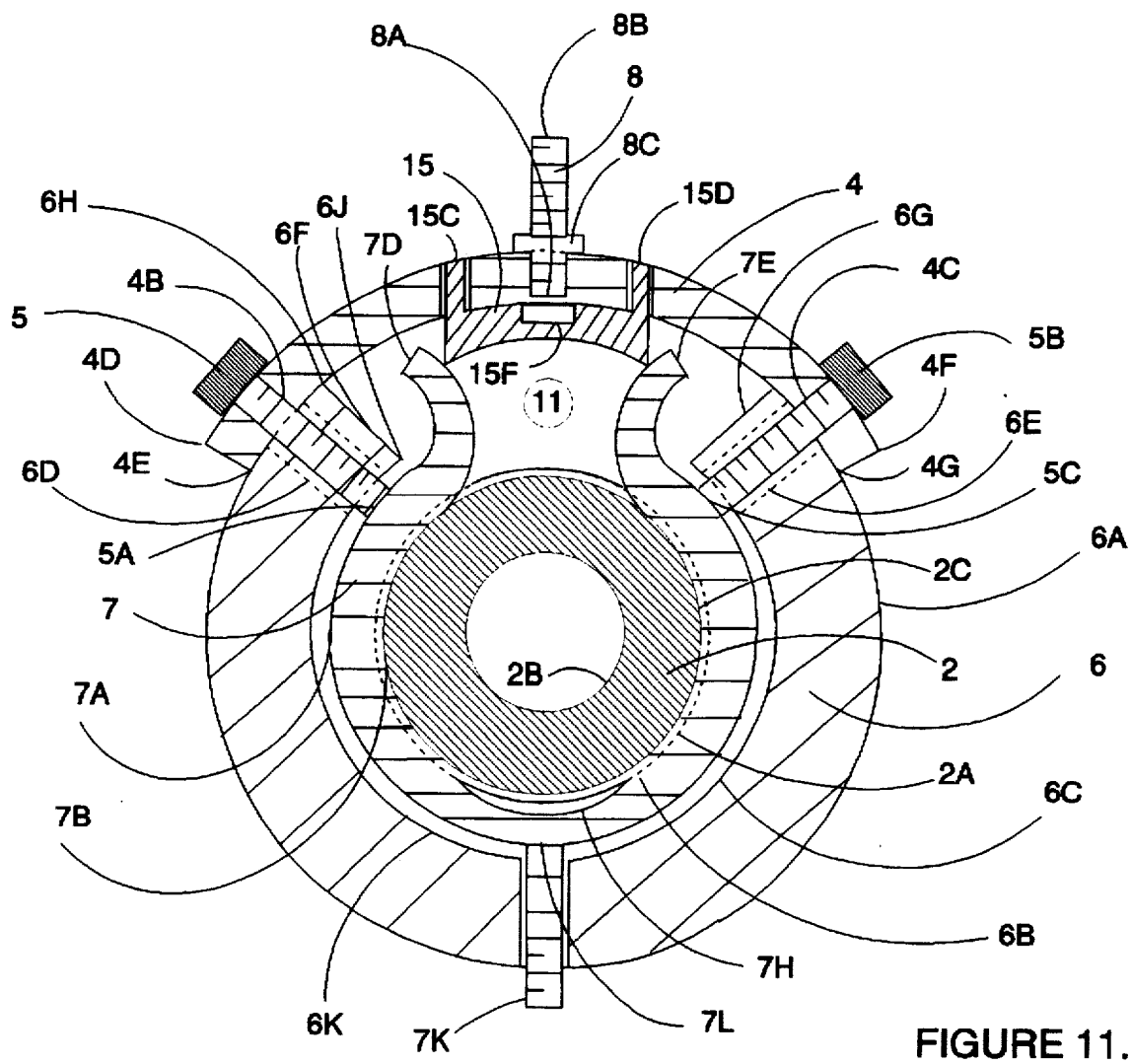
Figures 12, 13:
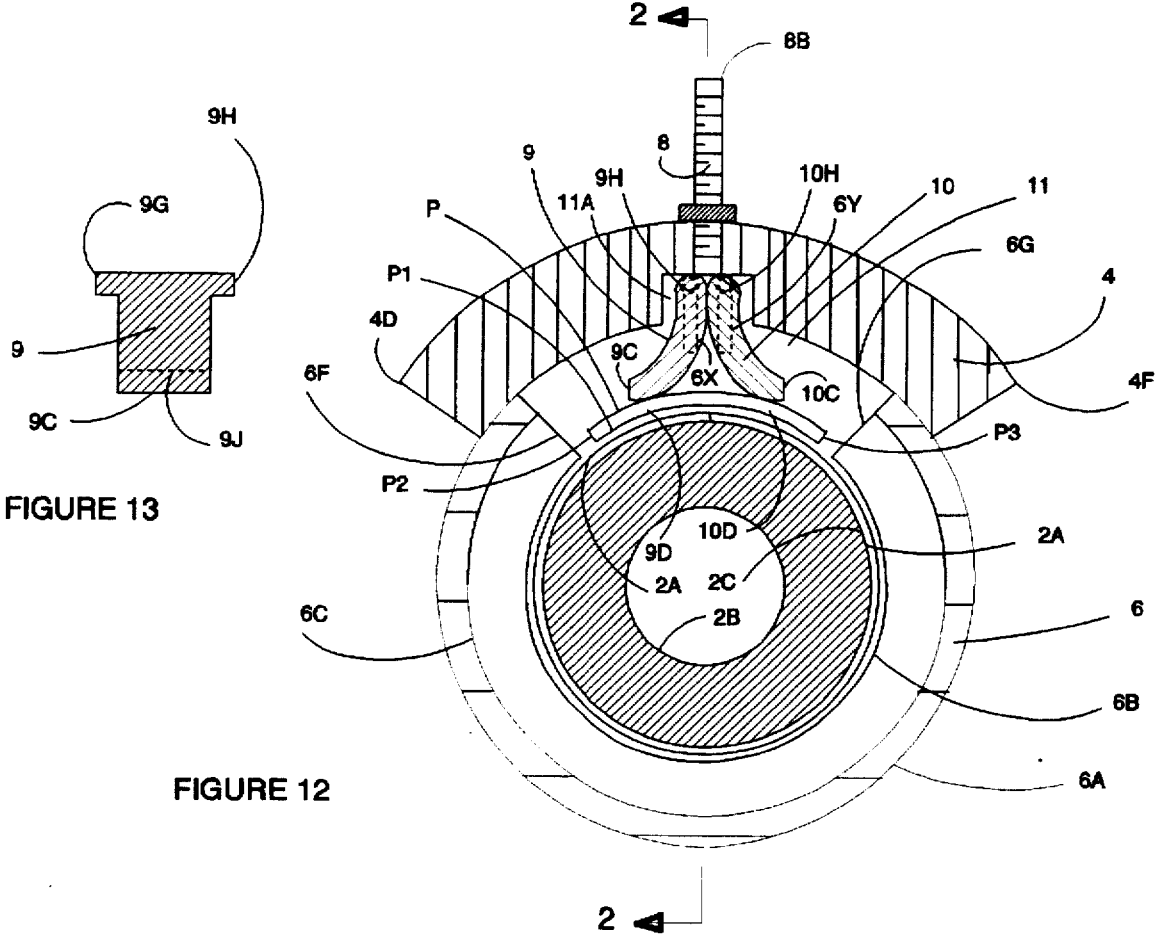
FIG. 13 is the view of the mini lever 9 looking at it by taking a longitudinal vertical section 2—2 through the bolt and the coupling body of FIG. 12.

The fit of the rings is designed to keep the rings housed inside the grooves 6K and 6L of the coupling body by making the outer diameters 7A and 22A of rings 7 and 22 larger than the inner diameter 6B of the body of the coupling, which diameter 6B equals the inner diameters of grooves 6K and 6L. The inner diameter 7B and 22B of rings 7 and 22 is less than the outer diameters 2A and 3A of pipes 2 and 3. The ring 7 may differ in thickness from a section to an other section as is shown by crescent 7H taken out the ring 7 in FIG. 1. The pipes 2 and 3 which are joined have corresponding circumferential grooves 2C and 3C in the end portions of the pipes to coincide with the grooves 6k and 6L in the respective end portions of the coupling. The mechanism which locks and unlocks the coupling to the pipe is made of an assembly of components; bolt 8, an arcuate piece 15, and two mini levers 9 and 10, and ridges P and 6N shown in FIG. 1 and FIG. 2. The thickness of the toes 9C and 10C of mini levers 9 and 10 is predetermined so that toes would not slip underneath the end portions of the resilient ring 7, and get locked. In some applications, as shown in FIG. 11, an arcuate piece 15 driven by the bolt 8, which passes through cover 4 is sufficient to make the invention operative. In other applications, mini levers 9 and 10 also are required for the invention to be operative, and still in other applications as shown in FIG. 12, bolt 8 and arcuate mini levers 9 and 10 will be enough to do the job. To use or not to use mini levers depends strictly on the design of the resilient ring, and the geometry of its two curved open ends and their strength, and the strength of the ring.

Figure 15:
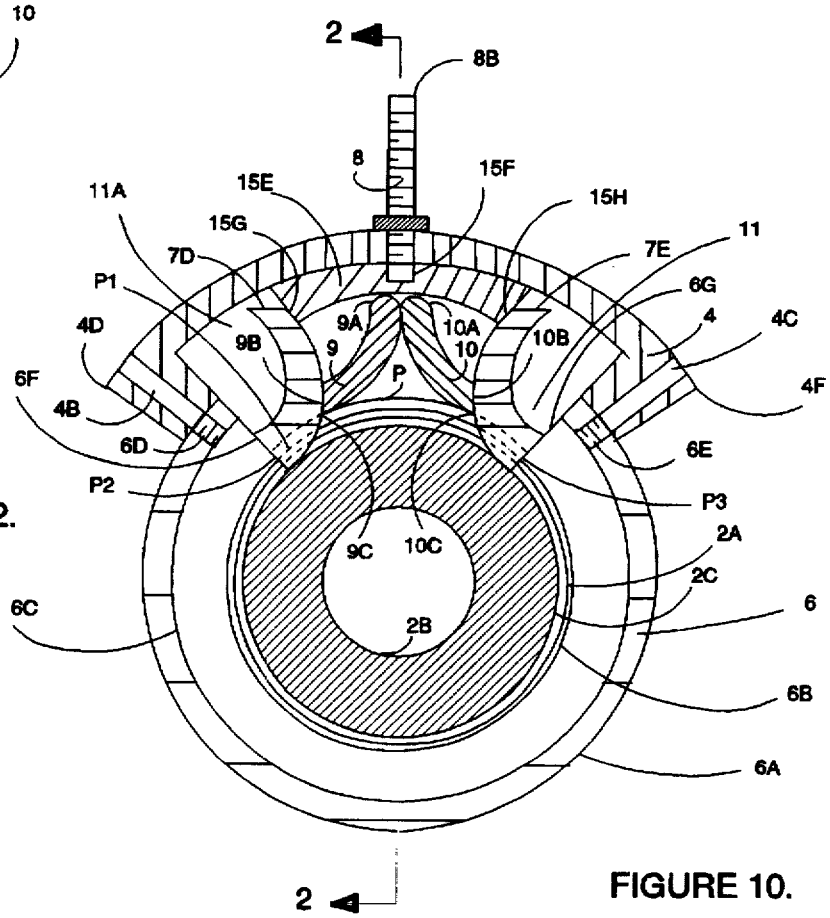
FIG. 15 is a transverse vertical section of mini levers 9 and 10 made integrally from a single piece of material.
Figure 10:
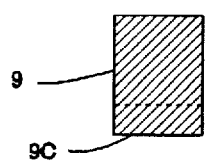

From here on, the coupling in all the figures, except FIGS. 5, 8, 13, 14, 15 and 16 will be explained simultaneously in terms of the vertical section in FIG. 1 because of the sameness of the assembly mechanism on both ends of the coupling to drive the mini levers 9 and 10. While the assembly mechanism in FIG. 1 is being explained, it is understood that the assembly mechanism on the opposite end of the coupling is also being explained simultaneously. The most important features of an assembly mechanism are made of a bolt 8, an arcuate piece 9 and two mini levers 9 and 10, and two arcuate ridges P and 6N. Preferably mini levers 9 and 10 are curved as shown in FIGS. 10, 12 and 15. Mini levers are made from rigid material of high strength to withstand pressure the levers would be subjected to. The mini levers as shown in FIG. 15 can be made from a single piece of resilient material of high strength, and the stock of material from which the mini levers are made is thinned out in the middle so that it would not provide much resistance against the functioning of the mini levers. The mini levers provided by a single piece act like a spring lever. The geometric design of the mini levers is dependent on the height and width available in said cavity. The mini levers 9 and 10 are put in a movable locked position hemmed between and among elements in a cavity 11 constructed in the end of the coupling body 6. The cavity 11 is delineated by sections 6F and 6G in the coupling body and the inner surface of an arcuate cover 4. The cover 4 is shown by 4D,4E,4F and 4G with a threaded opening 4A for the two way bolt 8. The two sides of cavity 11 are shown by 6F and 6G and the depth of the cavity is marked by 6H and 6J. The depth of the cavity in FIG. 1 equals the thickness of the coupling body 6. If required, the depth of the cavity can be increased by increasing the depth of the cover 4 as depicted by 11A in FIG. 10, where cover 4 for the cavity is provide extra height by its raised ends 4D and 4F. The cavity 11 is covered by an arcuate cover 4 fastened to the coupling body 6 by means of bolts 5 and 5B. On one end, away from the axis of the coupling, two mini levers 9 and 10 having their two ends 9A and 10A juxtaposed and on the other end their feet are spreaded on a arcuate ridge P as shown by their curved toes 9C and 10C. Mini levers are placed in an inverted "V" position, and are hemmed by an arcuate piece 15 located inside the cavity 11 next to the cover 4, and on the opposite side their spread is checked by two parallel oppositely constructed arcuate ridges P and 6N in cooperation with two open ends 7D and 7E of a resilient ring 7. An arcuate piece 15 preferably will have flat surface next to the threaded opening 4A. The geometric design of the two end portions of ring 7 can 21 differ from the design shown in the drawing figures. It is preferable to enlarge the outer diameter of the groove 6C adjacent to the two sections 6F and 6G in FIG. 1 to create an extra space for the two end portions of the open-ended ring to flex extra distance freely when they are being opened apart.

The length of the arcuate piece 15 in FIG. 1 is marked by 15A and 15B, and its two arms 15C and 15D are held in close fit through two openings through the body of the cover 4. The arms 15C and 15D can slide only toward or away from the axis of the coupling. To drive the assembly is a special two way bolt 8, with two ends 8A and 8B and an integral flat portion 8C dividing the stem of the bolt into two unequal parts, where the length of one part toward the end 8A of the stem is equal to or less than the thickness of the cover 4, and the length of the second part of the stem toward the end 8B is greater than the thickness of the cover. Said second part with end 8B is used to drive the two mini levers 9 and 10 in the assembly toward the axis of the coupling through an intermediate arcuate piece 15 thus forcing the two levers to spread their feet on and along two oppositely constructed parallel ridges P and 6N shown in FIG. 1, in doing so the ring 7 opens apart and also slips away to the opposite end inside of the groove in the inner body of the coupling. The short stem of Bolt 8 toward end 8A cannot act on said assembly by virtue of its limited length. When there is need to disconnect the coupling from the pipe, the end 8B of bolt 8 is driven into the threaded opening 8A to act on said assembly. It is equally practical to plug the threaded hole 4A with bolt having a short stem, and use the bolt key when it is needed to drive the mini levers to open the ring to release the pipe. .

Connecting the coupling to the pipe on both ends will be explained in terms of pipe 2 only, with pipe 2 having an outer diameter 2A and inner diameter 2B and with a groove having an inner diameter 2C. The connecting of pipe 3 is the same as the connecting of pipe 2, therefore, reference to pipe 3 is kept to a minimum. The description of a connection of one end of the coupling 6 to the one end of the pipe 2 explains simultaneously all the connections in FIGS. 4,5,6, 7,9 and 16, but the connection on one end in FIG. 5 and FIG. 16 will be explained else where. The same numerals to explain the grooves and the rings have been used in all figures. The end portions of valves will be considered as if they were the end portions of pipes or as if they were the end portions of the coupling, whatever the case may be.

There are two modes of connecting the coupling of this invention to the ends of two pipes; the worker has the choice of what mode he or she prefers.

The first step in both the first and the second mode is to drive two bolts 5 and 5B partially backward, receding the two ends 5A and 5C of the bolts into the coupling body 6 which frees the resilient ring from the bolts completely. In some applications the length of the bolts 5 and 5B will be such that they will remain outside groove 6C, thus there will be no need to recede them to free the ring.

Once the bolts are receded into the coupling body, then under the first mode of receiving the grooved pipe 2 into the coupling 6, the end 2D of pipe 2 is simply pushed into receiving opening 6B of the coupling until it coincides with the corresponding opposite groove 6K which is shown by 6C and 6B in FIG. 1. In doing so, the resilient open-ended ring 7 flexes to a larger diameter inside of groove 6K in the body of coupling 6. As soon as the two opposite grooves 2C and 6K approximately coincide, then ring 7 because of its memory resorts back to its original diameter inside of grooves 2C and 6K. This completes the operation of connecting pipe 2 with one end of the coupling with groove 6K in its end portion. To disconnect the pipe from the coupling will be explained when describing the second mode.

Once the resilient ring is locked in two opposite grooves 2C and 6K, the resilient ring can be further tightened with the aid of two bolts 5 and 5B passing through two holes in the cover 4, which are also held in two corresponding threaded openings 6D and 6E through the body of coupling 6. Driving in the bolts 5 and 5B acts on ring 7 by moving the ends 5A and 5C of the bolts forward toward the axis of the coupling to press the ring 7 against pipe 2. In this manner the bolts 5 and 5B which are used in fastening the cover 4 to the coupling body 6 are also used to lock the ring 7 in place and force the ring to grip firmly against pipe 2. The angles of the bolts 5 and 5B, through the cover 4 and the coupling body 6, can be different in different applications. If the requirement is such that a still stronger grip of ring 7 is needed against pipe 2, then extra bolts like 20 and 21 shown in FIG. 2 can be used on as many locations as it is required. Bolts 20 and 21 can be of the same type as the bolts 5 and 5B.

In the second mode of connecting the coupling with the pipe, before the pipe is received by the coupling 6, the resilient ring 7 shown in FIG. 1 is pushed into the groove 6K by means of the bolt 8 and two levers 9 and 10 described above in the assembly. The end 8B of the bolt 8 is screwed into the threaded opening 4A to push the arcuate piece 15 toward the axis of the coupling which transmits force to the mini levers 9 and 10 and causes 9C and 10C, the already spreaded feet of the levers, to spread still further apart. Instead of a bolt, a bar attached to other mechanical means may be used to exert a force on the levers where remote control is needed to release the pipe. The spread between feet 9C and 10C of levers 9 and 10 on two arcuate and oppositely parallel ridges is preset such that, under the acting force of bolt 8 through intermediate arcuate piece 4, the feet slip further apart without any resistance and frees the resilient ring 7 from the groove 2C of the pipe. The mini levers 9 and 10 act on two opposite shifting points 9B and 10B on end portions 7D and 7E. The ring 7 flexes to a new larger diameter as it is pried and pushed apart by the levers 9 and 10, and it assumes its new position inside groove 6K in the body of the coupling. Ring 7 can be kept in this new position as long as it is desired. From here on the connecting of pipe 2 with the coupling 6 under the second mode is the same as of connecting pipe 2 with the coupling 6 under the first mode, except that, the pipe 2 does not encounter the ring 7 until the ring is lowered into the groove 2C in the end portion of the pipe 2. Once the two grooves 2C and 6K coincide, the resilient ring can be lowered into groove 2C by driving bolt 8 backward until the bolt is completely drawn into cover 4. By doing so, the mini levers 9 and 10 are released from the pressure of the bolt transmitted through arcuate piece 15, and their feet 9C and 10C are driven closer by the pushing action of the open ends 7D and 7E of the open-ended ring 7 acting at the shifting points of contact 9B and 10B. The location of the points 9B and 10B depends on the position of the spread of the feet 9C and 10C of the mini levers 9 and 10. Then bolts 5 and 5B are tightened to tie ring 7 in place and causing it to grip the pipe firmly. The bolt 8 is taken out of the opening 4A and is threaded again into the same opening 4A by orienting the end 8A toward the axis of the coupling; thus the bolt is uncommissioned until it is required to drive the assembly mechanism again.

Once pipe 2 is connected to the coupling, then the connecting of pipe 3 with the coupling is the same as that of pipe 2.

As shown in FIG. 10 arcuate piece 15E can act simultaneously along with the action of mini levers 9 and 10 up on ring 7 to a push apart the ring or they can be designed with delayed action where 15E may act before the acting of 9 and 10 and vice versa.

As shown in FIG. 11 the arcuate piece 15 can push apart the ring 7 without mini levers 9 and 10, but it is determined that in some instances their combination is desirable and is highly efficient.

A gap may be allowed between the ends of the pipes 2D and 3D, mounted inside the coupling body, or they may touch each other. Different types of seals can be used to seal the leakage from the coupling. Invented seals 14 and of types 12, 12A are shown to illustrate the concept of sealing the coupling against leakage. The disconnecting of the pipe from the coupling is the reverse of the operation performed to connect the pipe to the coupling. The bolt 8 with its end 8B is driven into the threaded opening 4A to drive said arcuate piece and mini levers downward toward the axis of the coupling to push apart said ring, and causing the levers to spread their feet 9C and 10C to a greater distance between them. This pries apart ends 7D and 7E of the open-ended resilient ring 7 to a greater distance, and causes the ring 7 to assume a new position in side groove 6k by assuming a larger diameter, thus freeing the pipe 2 so it can be pulled out from the coupling.

On the other end of the coupling in FIG. 2, the resilient ring 22 in groove 3c is shown with inner diameter 22B and outer diameter 22A. Two arcuate ridges for the mini levers are shown as 6V and 17P. The outer wall 18 of the cavity is shown by 18, and 19 and 19A depict the two ends of the bolt, analogous to bolt 5 and 5A, on the opposite end of the coupling. An arcuate piece is depicted by 16 and one mini lever is shown by 13. Unlike the cover 4 and cover 17 shown in FIG. 2, various types of covers can be designed which can provide not only the cover and the outer wall like 6S for the cavity 11 numbered in FIG. 1, but it also can provide integral arcuate ridge like P. A threaded opening for the bolt (bolt is no shown) like bolt 8 is shown by 17A.

FIG. 3 duplicates the view in FIG. 2 for clarity, and it shows mini lever 9 with arcuate piece 15 and 15A. The boundary of cavity 11 is shown by 11D. The gap 11C all around between the wall of cavity 11 and mini lever 9 is exaggerated. Two ridges on which foot 9C stands to slide are shown by P and 6N. Bottom width of Mini lever 9 approximately equals the width of the groove 2C plus the width of ridges P and 6N.

FIG. 4 shows couplings used as lids 23 and 24, and a valve is incorporated into the coupling to join pipes 2 and 3. The seals are shown by 26 and 26A and 23A and 24A. The partition of the valve is shown by 29. Rings 7 and 22 are shown in locked position in grooves 6K and 6L. It is clear that coupling 6 with dead end 23 can make a lid to any pressure vessel.

Figure 5:
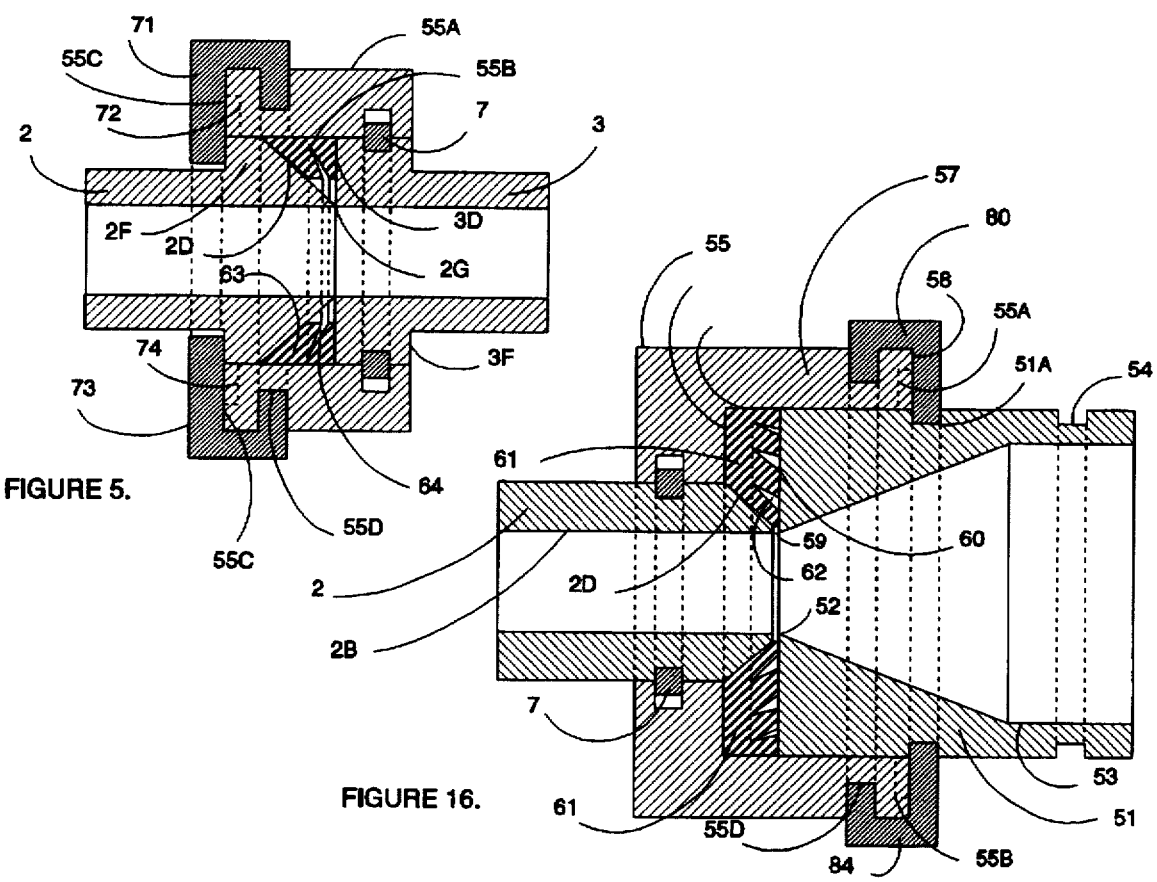

FIG. 5 shows the compound coupling 55A connecting two pipes 2 and 3. The compound coupling has one regular end of the invented coupling and the other end of the coupling has a connector made off a set of jaw members (of my invention U.S. Pat. No. 5,387,017), which set includes jaws 71 and 73. These jaws are mounted for limited movement with respect to the coupling body around the central axis of the receiving end opening of the coupling. Jaw members are fixed in movable position around the coupling body with the aid of a groove 55D and also are positioned against the face 55C of the coupling. The jaw members include camming surfaces which mate with camming surfaces of the coupling body so that as the jaw members move around the receiving opening in one direction, they also move to closed position, but as they move in the opposite direction, they move to open position. The camming surfaces of the jaw members are bolts and pins not shown in the figure extending through the jaw members into receiving slots like 72, 73 in the coupling body which form the mating camming surfaces of the coupling body and vice versa. For thinner pipes to provide shoulders or grooves rings 2F and 3F are welded to the ends of the pipe to provide sufficient depth for the lopsided trapezoidal gasket 63, which gasket caries a slanting arcuate slit 64 in its inner body. The end 2D of pipe 2 is beveled and the end of pipe 3D has plane end with vertical cut. When two said ends meet together at 2G inside the coupling body enclosed by the inner surface 55B of coupling 55A, they create an enclosure for the lopsided gasket 63. Thus the gasket cannot come out of the enclosure. If desired a gap may be allowed between the pipes, and still the gasket can be kept safely lodged inside said enclosure. The compound coupling has a resilient ring 7 in its one end portion and movable jaw members at the other end to connect two pipes. Whether, this coupling is used with pipes or with hoses, the user has preferred choice which connector he or she would prefer to use when one end of coupling always remain connected in place. The compound coupling has distinct cost effective advantages in some applications. The means lodged in said cavity to move the resilient ring are not shown. The ring works the same as explained else where. The invented lopsided gasket and the enclosure for it makes the connecting and disconnecting of the pipes extremely easier than before.

Figure 6:
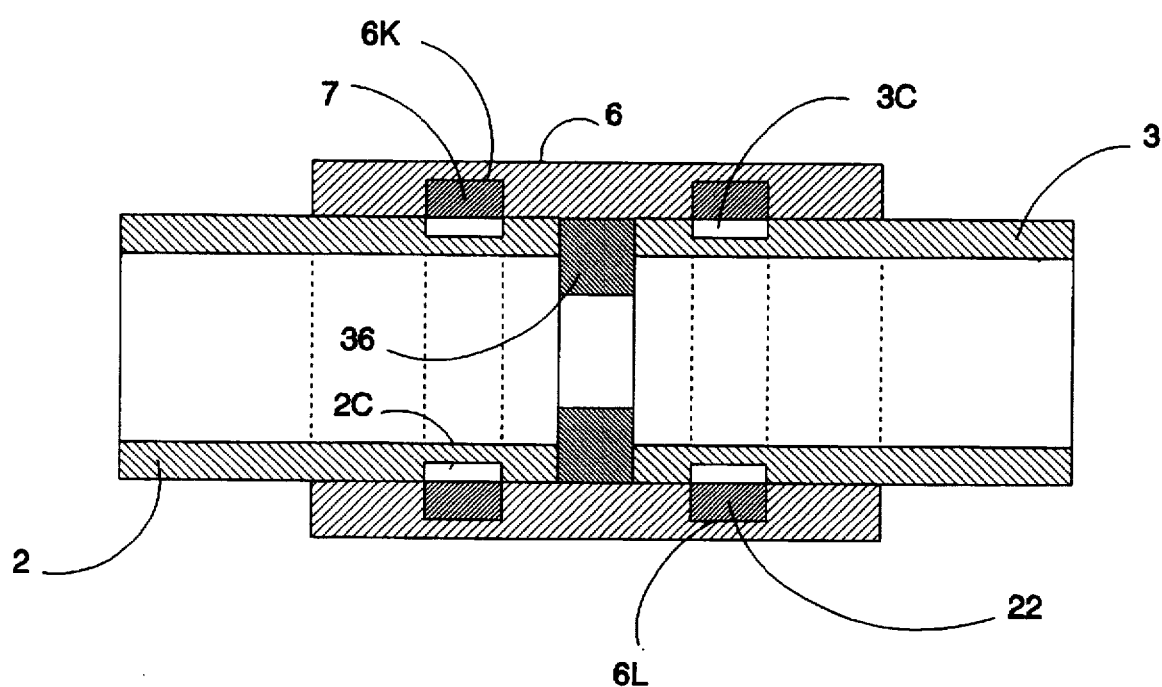

FIG. 6 shows a coupling connecting two structural pipes 2 and 3 separated by a ring 36. Rings 7 and 22 are shown in their open positions. The grooves are shown by 2C, 6K, 3C and 6L.

Figure 7:
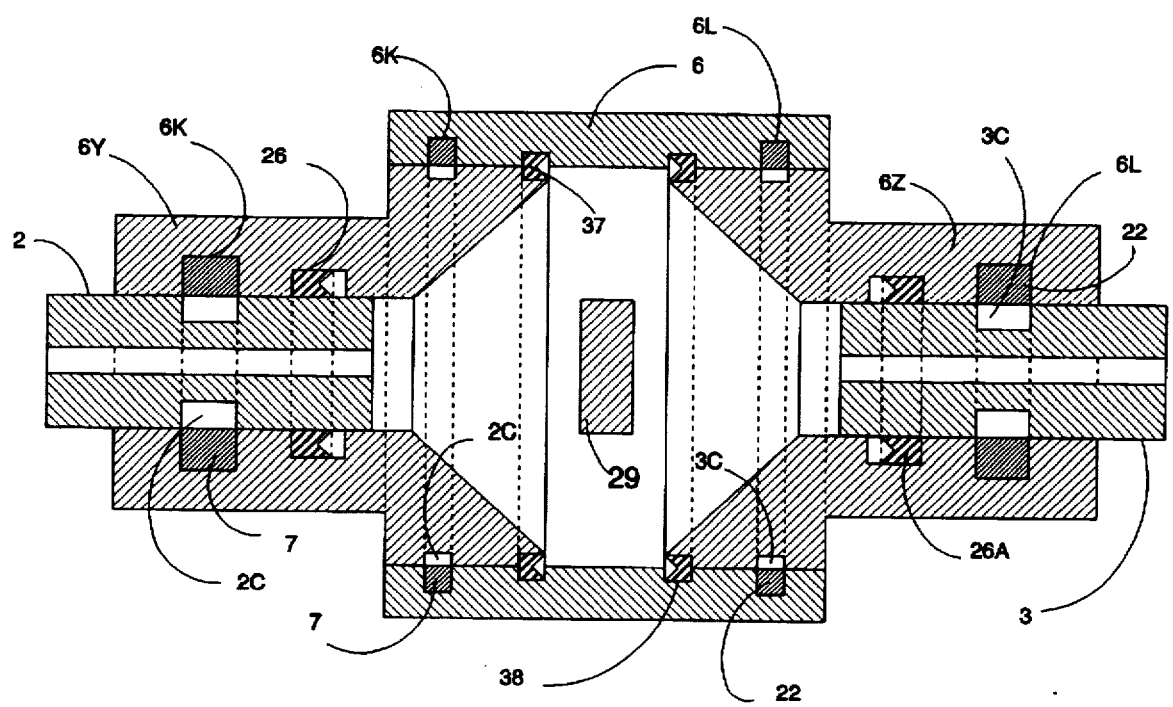

FIG. 7 shows where a valve incorporates coupling 6 as a component which makes the cover of the valve, and cover has rings 7 and 22 which attach the cover to other two parts 6y and 6Z of the valve body. Part 6Y and 6Z function as coupling to attach the valve body to the pipes 2 and 3. Seals are shown by 26, 26A, 37 and 38, and the partition of the valve is shown by 29. All other elements have been explained earlier in other FIGS. The rings 7 and 22 are shown in unlocked position. Grooves are depicted by 2C, 6K, 3C and 6L.

Figure 8:
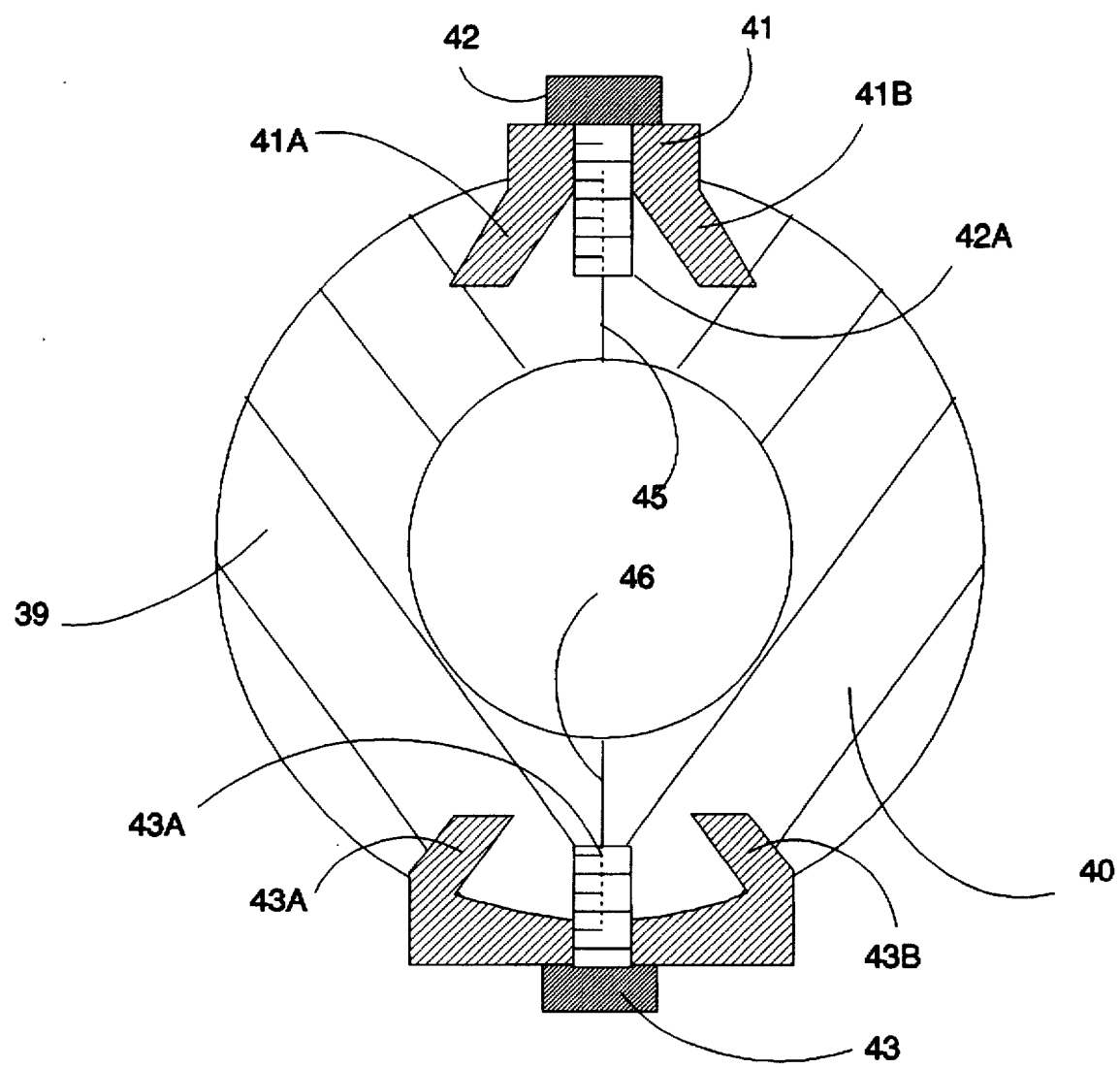

FIG. 8 shows where two arcuate pieces 39 and 40 are joined along lines 45 and 46, and are used to make the coupling's arcuate body. Two types of dovetail joints are shown, one of which is depicted by a wedge 41, with arms 41A and 41B, and the other by a wedge 43, with arms 43A and 43B. Bolts 42 and 44 prevent an axial movement of 41 and 43. These bolts can also be located outside the coupling body, in that case, two bolts will be needed; one on each end of the wedge, to prevent the movement of the wedge. The inner groove is shown by 6C. The coupling body also can be made from two arcuate pieces each having two radial flanges which can be tied together by means of two bolts.

Figure 9:
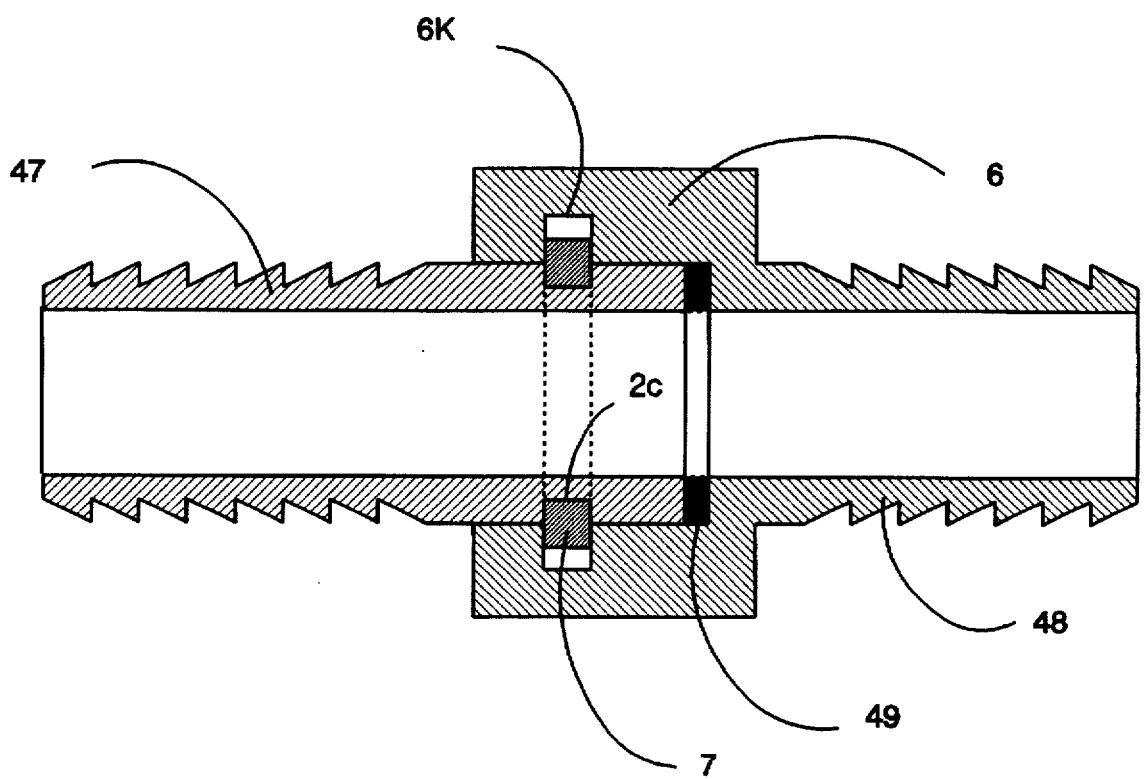

FIG. 9 shows where coupling 6 is used to connect two hoses (hoses not shown) by means of connecting the inserts 47 and 48 which go into the hoses. Ring 7 of coupling 6 and groove 6K are the same as in FIG. 1 and FIG. 2. The seal is shown by 49. The coupling 6 is shown in the locked position.

FIG. 10 is the same as FIG. 1, but ring 7 is not shown in its entirety, only the modified end portions are shown from P2 to 7D and from P3 to 7E. In this figure mini levers 9 and 10 are shaped into arcuate pieces which are partially located inside the extended cavity 11A. But arcuate piece 15E is located in the extended cavity 11A and is shown to be in contact with the end portions 7D and 7E at points 15G and 15H. When the end of bolt 8 is made to act on 15E by means of a cavity 15F, the arcuate piece 15E and mini levers act almost in unison against end portions of ring 7 at points 15G, 15H, 9B and 10B to push and to open up the ring. If delayed action either of arcuate piece 15E or the mini levers 9 and 10 is required against the end portions of ring 7 then gap is designed at points 15G and 15H or gap is allowed between said mini levers and 15E while 15E touches 7D and 7E at points 15G and 15H. Because of cavity 15F, which is provided for end 8B of bolt 8 and by virtue of the location of 15E between 7D and 7E the arcuate piece 15E is not provided any arms like the arms 15C and 15D as shown in FIG. 1. The length of cover 4 for the cavity is marked by 4D and 4F in FIG. 10. All the other elements of FIG. 10 have been described before. It is obvious that a portion of the cover 4 along with the bolt 8 over the arcuate piece 15E can be removed, and pressure by any other means other than bolt 8 can be brought to act against the cover 15E or in couplings where the resilient strength of the resilient ring is low, pressure can be exerted by any suitable hand tool or merely by person's thumb to make the invention operative. If desired then portion of 15E can be given an extra thickness to make it to come out through the matching opening in cover 4. Again it is obvious that mini levers constructed from a single piece of material shown in FIG. 15 can be made to exit through cover 4, while their feet remain in the cavity. This eliminates the use of the arcuate piece 15E, and mini lever can be acted up on by any other means other than the bolt 8 or can be acted up on by the pressure of person's thumb as was state above.

FIG. 11, is modification of FIGS. 1 and 10 where mini levers 9 and 10 are not employed. In some application arcuate piece 15 alone is sufficient to push and to open up the ring 7 to a larger diameter. An optional stabilizer pin or a bolt 7K may be incorporated in the design of ring 7 emerging at 7L from the ring, and 7K need not to come out of 6 as shown in the FIG. 11. The design of arcuate piece 15 may be modified to be a movable tapered wedge with an extra thickness between end portions 7D and 7E. The arcuate wedge piece 15 is driven by end 8B of bolt 8 by means of cavity 15F to push apart end 7D and 7E. Because of the location of 15 and cavity 15F as stabilizer the arms 15C and 15D can be eliminated. All other elements of this figure have been discussed before.

In FIG. 12, arcuate mini levers 9 and 10 are shown without any arcuate piece 15 or 15E shown in FIGS. 1, 10 and 11. In this arrangement intermediate arcuate 15 or 15E is not needed, bolt 8 alone is sufficient to drive the mini levers. Mini levers are partially located in the extended cavity 11A in cover 4. In this arrangement bolt 8 passing through cover 4 is used directly to drive mini levers 9 and 10 while the mini levers are kept in movable alignment by means of integral guiding arms they bear. Two guiding arms are depicted by two dotted circles 9H and 10H. Guiding arms 9H and 10H are fitted to slide up and down in the vertical grooves 6X and 6Y in the two opposite walls of cavity 11 and 11A. The Mini levers 9 and 10 driven by bolt end 8B of bolt 8 have the same function as explained earlier to act on the resilient ring 7 which is not shown in FIG. 12. The arcuate ridge is shown by P, P1, P2, and P3.

In FIG. 13 depicts mini lever 9 seen in the vertical section 2—2 taken on FIG. 12. The top of toe 9C of mini lever 9 is depicted by a dotted line 9J. The guiding arm are shown by 9G and 9H which slide up and down in the vertical grooves provided for them in the two opposite walls of the cavity. One of the vertical groove 6X is depicted in FIG. 12.

FIG. 14 shown next to FIG. 10 depicts mini lever 9 seen in FIG. 10 by taking a vertical section 2-2. The foot of 9 is shown by 9C.

FIG. 15 shows mini levers 9 and 10 constructed from a single piece of resilient material by thinning out the material at the top which gives the mini levers the property of a spring. Thus it is clear that mini levers also can be constructed from a single stock of resilient material which integrally provides an arcuate section which can be acted up on by bolt 8 to impart force to the mini levers 9 and 10 to open apart ring 7.

FIG. 16 shows compound coupling, which is the exact type of coupling shown in FIG. 5, the only difference is that coupling 55 connects pipe 2 and reducer 51 with transition in diameter from 52 to 53. Gasket 61 is provided series of vertical parallel arcuate slits 62. The enclosure for the gasket is provided by the beveled end 2D of pipe 2 and the vertical face 60 of reducer 51, and inner surface of coupling body shown by 55A and 55B. A gap between the pipe and the reducer is shown by 59. A groove at the end of reducer is shown by 54. The resilient ring 7 works the same as explained else where. The jaws 80, 84 member of a set of jaws are held to the coupling end 58 by grooves 55D and 51A; and the pins or bolts not shown. Pins and bolts passing through the jaw members are mounted into the grooves like the grooves shown by 55A and 55B and act as camming surfaces as explained in FIG. 5. The jaw members in FIG. 16 work exactly like the jaw members explained in FIG. 5.

Whereas this invention is here illustrated and described with reference to embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A coupling for joining to an end portion of a pipe wherein the end portion of the pipe has an outside diameter and a circumferential groove distant away from the end of pipe, comprising;

a coupling body to closely receive an end portion of a pipe therein and to extend over the end portion of the pipe a distance beyond the outer edge of the groove constructed farthest away from the end of the pipe;

a resilient open-ended ring having a natural inside diameter less than the outside diameter of the end of the pipe:

means movably mounting the resilient open-ended ring in the coupling body for radial movement away from the pipe received in the coupling body and opposite radial movement toward the pipe received in the coupling body, whereby when the resilient open-ended ring moves toward the pipe to its natural diameter it engages the groove to secure the coupling body to the pipe and when the resilient open-ended ring moves away from the pipe to assume a larger diameter than its natural diameter it disengages the groove so the pipe can be removed from the coupling body;

means responsive to applied radial force for moving the resilient open-ended ring with respect to the coupling body to increase its diameter from its natural diameter; and means operable by a user to apply radial force to the means responsive to applied radial force for moving the resilient open-ended ring.

2. A coupling for joining to the end portion of a pipe according to claim 1, wherein the coupling joins two pipes in end-to-end relationship, each pipe having an end portion and a groove in the end portion, wherein the coupling body is adapted to closely receive the end portion of each of the two pipes to be joined in end-to-end relationship, the resilient ring being located in the coupling body to engage the groove in the end portion of one of two pipes to be joined, the coupling further including a second resilient open-ended ring having a natural diameter less than the outside diameter of the end of the other pipe, means movably mounting the second resilient open-ended ring in the coupling body for radial movement away from the other pipe received in the coupling body and opposite radial movement toward the second pipe received in the coupling body, the second resilient open-ended ring being spaced in the coupling body from the first resilient open-ended ring and being located in the coupling body to engage the groove in the end portion of the other pipe to be joined when such an other pipe is received in the coupling body and the second ring moves toward the other pipe to its natural diameter, and to disengage the groove of such other pipe of the two pipes when the second open-ended resilient ring moves away from the other pipe to assume a larger diameter than its natural diameter second means responsive to applied radial force for moving the second resilient open-ended ring with respect to the coupling body to increase its diameter from its natural diameter, and second means operable by a user to apply radial force to the second means responsive to applied radial force for moving the second resilient open-ended ring.

3. A coupling for joining to the end portion of a pipe according to claim 2, wherein the coupling body is substantially cylindrical having opposite end portions and of a length to extend beyond the circumferential grooves of one pipe of the two pipes to be joined in end-to-end relationship and beyond the circumferential groove of the other pipe of the two pipes to be joined, and wherein the resilient open-ended ring is located in one end portion of the coupling body and the second resilient open-ended ring is located in the other end portion of the coupling body.

4. A coupling for joining to the end portion of a pipe according to claim 3, wherein the coupling body includes sealing means for sealing the ends of the pipes to be joined to prevent leakage.

5. A coupling for joining to the end portion of a pipe according to claim 4; wherein the sealing means is at least one seal.

6. A coupling for joining the end portion of a pipe according to claim 3, wherein cylindrical coupling body is made from two arcuate pieces held together by dovetail groove joints, and bolts or pins to prevent the movement of the joint.

7. A coupling for joining to an end portion of a pipe according to claim 1, wherein the means responsive to applied radial force are levers associated with ends of the open-ended ring, said levers each having ends and being arranged so that radial force applied to one end of the levers is converted to spreading force against the ends of the open-ended ring.

8. A coupling for joining to an end portion of a pipe according to claim 7, wherein the levers are arranged in "V" formation with the open end of the "V" against the ends of the open-ended ring, and wherein the means operable by a user to apply radial force applies radiance force to the point of the "V".

9. A coupling for joining to an end portion of a pipe according to claim 8, wherein the levers are two separate levers.

10. A coupling for joining to an end portion of a pipe according to claim 8, wherein the levers are joined at the point of the "V".

11. A coupling for joining to an end portion of a pipe according to claim 8, wherein the means operable by a user to apply radial force includes a bolt which can be turned by the user to cause radial force to be applied to the point of the "V".

12. A coupling for joining to an end portion of a pipe according to claim 7, wherein the levers are extensions of the end of the open-ended ring and extend radially from the ends of the open-ended ring diverging from one another as they extend from the ring, and the means operable by a user to apply radial force applies force between the diverging levers to force them apart.

13. A coupling for joining to an end portion of a pipe according to claim 12; wherein the means operable by a user to apply radial force includes a bolt which can be turned by the user to move a wedge between the diverging levers to force them apart.

14. A coupling for joining to an end portion of a pipe according to claim 1, wherein the resilient open-ended ring has ends which extend radially outwardly from the resilient open-ended ring between and radially beyond ridges which serve as supporting surfaces for the means responsive to applied radial force for moving the resilient open-ended ring with respect to the coupling body to increase its diameter by moving the ends extending between the ridges along the ridges.

15. A coupling for joining end portions of two pipes to be joined in end to end relationship wherein the end portions of the pipes each have an outside diameter and a circumferential groove distant away from the ends of pipes, and wherein the end of the pipe to be joined when inside the coupling body is beveled and the end of the other pipe to be joined when inside the coupling body has a plane end, comprising;

a coupling body having an inner surface to closely receive the end portions of the pipes to be joined therein and to extend over the end portions of the pipes a distance beyond the outer edge of the respective grooves constructed farthest away from the ends of the pipes;

a resilient open-ended ring in opposite end portions of the coupling body, each ring having a natural inside diameter less than the outside diameter of the end portion of the pipe to be received in the coupling body;

means movably mounting each of the resilient open-ended rings in the coupling body for radial movement away from the respective pipe received in the coupling body and opposite radial movement toward the respective pipe received in the coupling body, whereby when the resilient open-ended rings move toward the pipes to their natural diameter they engage the respective grooves to secure the coupling body to the pipe and when the resilient open-ended rings move away from the pipes to assume a larger diameter than their natural diameter they disenagage the grooves so the pipes can be removed from the coupling body;

means for separately moving respective resilient open-ended rings with respect to the coupling body, and a sealing means located between the two ends of the pipes inside the coupling body including at least one lopsided gasket carrying an arcuate slanting slit in the inner body of the gasket, and the gasket is lodged inside an enclosure provided by the beveled end of the one pipe and the plane end of the other pipe and the inner surface of the coupling body.

\* \* \* \* \*